United States Patent [19]

Maropis et al.

[11] 4,337,385
[45] Jun. 29, 1982

[54] ORBITAL TOOL SUPPORT SYSTEM FOR EDM MACHINES AND OTHER MACHINE TOOLS

[75] Inventors: Nicholas Maropis, Phoenixville, Pa.; Matt Kubistant, Brookfield, Ill.

[73] Assignee: UTI Corporation, Collegeville, Pa.

[21] Appl. No.: 795,726

[22] Filed: May 11, 1977

[51] Int. Cl.³ .............................................. B23P 1/12
[52] U.S. Cl. ................................................ 219/69 V
[58] Field of Search ................. 219/69 V, 69 E, 69 R, 219/69 G

[56] References Cited

U.S. PATENT DOCUMENTS

Re. 26,970 10/1970 Bentley et al. ................... 219/69 V
3,433,919 3/1969 Braudeau et al. ................. 219/69 V Primary Examiner—C. C. Shaw
Attorney, Agent, or Firm—Kinzer, Plyer, Dorn & McEachran

[57] ABSTRACT

An orbital tool support system for a machine tool such as an EDM machine, and ECM machine, or a conventional milling machine, of the kind including an orbiting head comprising two head elements interconnected by an orbital drive; the head is mounted centrally between a machine mounting plate affixed in centered relation to the tool head of the machine and a tool mounting plate that supports one or more electrodes or other tool elements. A plurality of slide bearing assemblies interconnect the two mounting plates in an X-Y bridge structure, maintaining the plates in parallel fixed vertical alignment but permitting limited onmidirectional relative movement in a horizontal plane. The bridge structure absorbs the vertical reaction forces resulting from machining operations, affording a dynamically stable tool support structure, even for very large electrodes or other tools; the bridge can be integral with or retrofit to virtually any EDM machine and to a wide variety of other machine tools.

6 Claims, 7 Drawing Figures

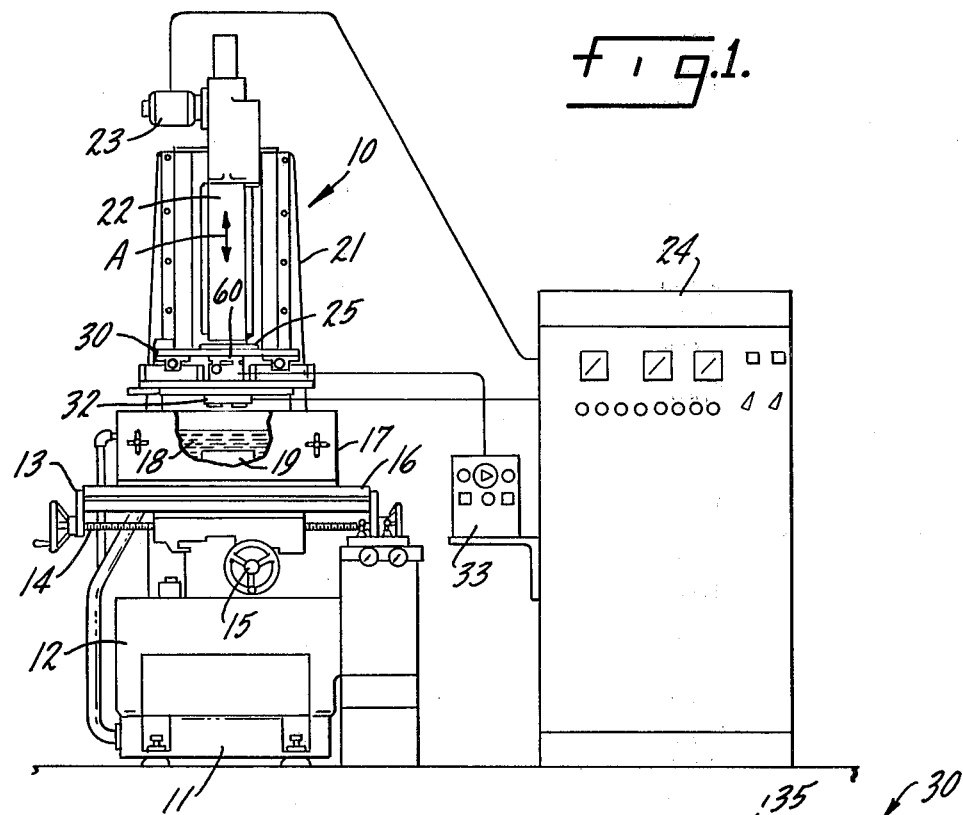
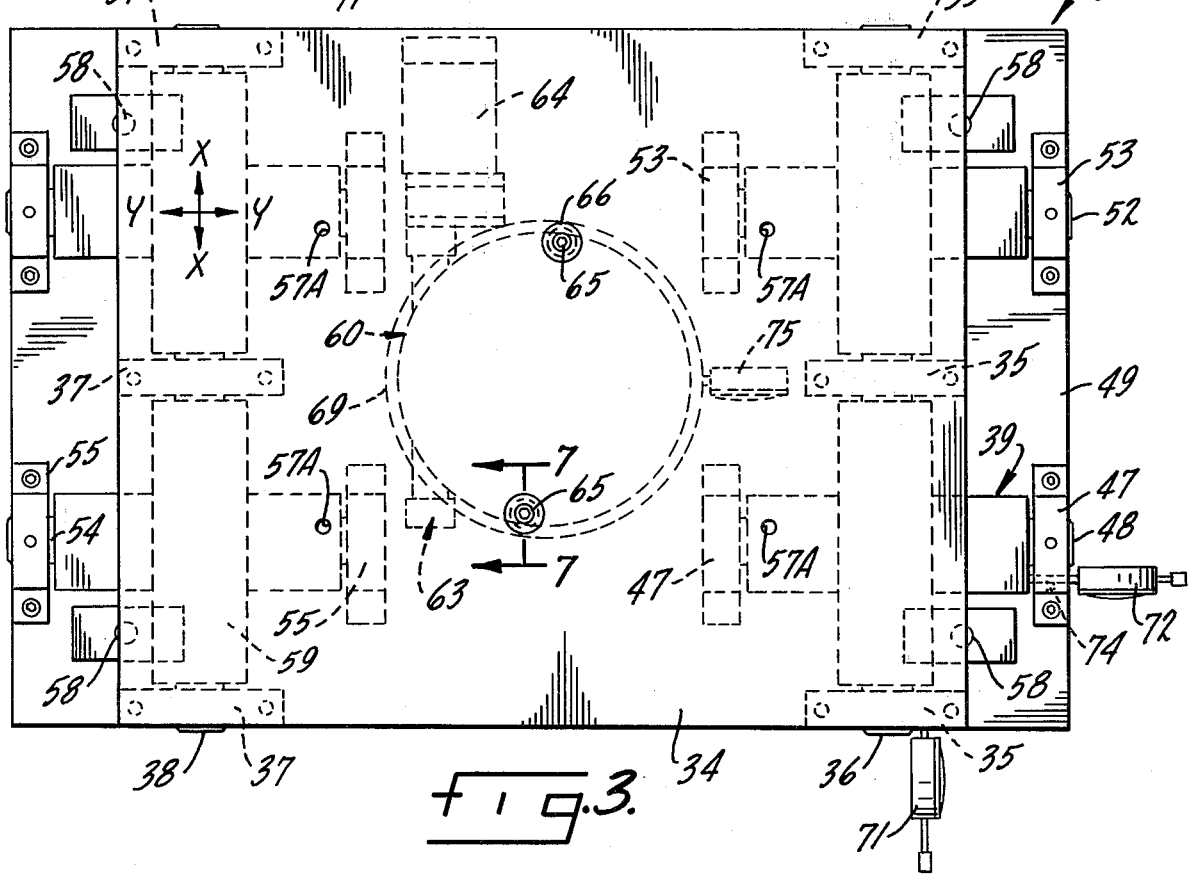

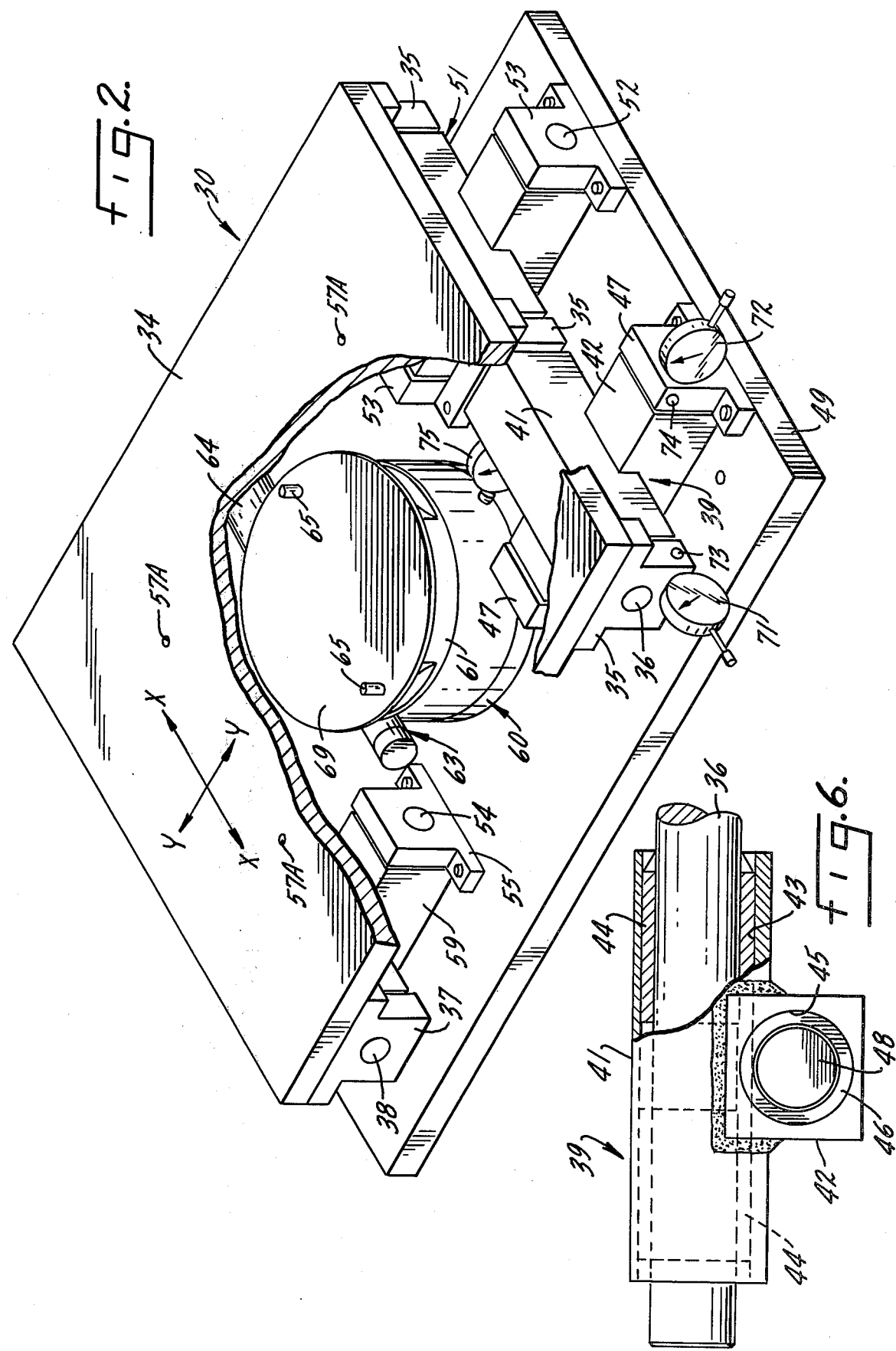

ORBITAL TOOL SUPPORT SYSTEM FOR EDM MACHINES AND OTHER MACHINE TOOLS

BACKGROUND OF THE INVENTION

In electrical discharge machining (EDM), a metal workpiece immersed in a bath of an ionizable dielectric is machined to a desired shape by electrical erosion. That is, an electrode of the required configuration is lowered into the bath, in proximity to the workpiece, and a series of electrical current discharges are generated between the electrode and the workpiece. Each spark or arc discharge between the electrode and the workpiece results in limited erosion (cutting) of the workpiece. With continuing movement of the electrode toward the workpiece, the workpiece is ultimately shaped to the configuration of the electrode. This kind of machining is particularly useful in the cutting of irregular cavities or external configurations, though the technique can be employed for relatively simple and symmetrical shapes as well.

Although electrical discharge machining follows the shape of the electrode quite precisely, the cavity or other surface cut into or on the workpiece does not conform exactly to the electrode dimensions, differing therefrom by the length of the arc gap that must be maintained between the electrode and the workpiece during machining. On the other hand, for maximum efficiency in an EDM operation, the erosion rate is preferably not maintained constant. For initial rough shaping, a high working speed is utilized, with arcs of maximum intensity that remove relatively large amounts of metal. For surface finishing, arcs of lesser energy are employed, over a shorter arc path.

In a conventional EDM process, the requirement for a change in the length of the arc gap has often necessitated the use of a series of electrodes, all of similar configuration but having dimensions adapted to the particular machine speed at which each was to be used. The expense and difficulty of providing a series of electrodes of this kind is effectively eliminated by the use of orbital electrode supports, particularly as described in Braudeau et al U.S. Pat. No. 3,433,919 issued Mar. 18, 1969. With this technique, the electrode is moved horizontally during the EDM process, particularly during that portion of the machining operation required to provide a final finished surface, in what is usually referred to as an orbital path. The horizontal motion of the electrode may follow a circular path; however, depending upon the configuration of the cut being made in the workpiece and the finish requirements for the machining operation, the transverse or horizontal motion of the electrode may be along an oval path or an irregular path, or may even approach linear reciprocation. Any and all of these types of motion are intended to be included in any reference to "orbital motion" or to an "orbital path" in this specification.

In known orbital tool supports, the apparatus for generating the horizontal orbiting motion of the electrodes is usually mounted in direct centered relation on the vertically movable platen or tool support head of a conventional EDM machine, with the electrode supported directly from the orbiter. Machines of this kind are described in the aforementioned Braudeau patent, in Mayer et al U.S. Pat. No. 3,322,929 issued May 30, 1967, and in Bentley et al U.S. Pat. No. 3,135,852 issued June 2, 1964. In other known arrangements, on the other hand, the orbiting head has been mounted on a vertical axis displaced from the machine axis; see, for example, Furze et al U.S. Pat. No. 3,539,754 issued Nov. 10, 1970 and Weber U.S. Pat. No. 3,809,852 issued May 7, 1974.

A substantial problem presented in connection with either type of EDM orbiting head, as referred to above, is a lack of dynamic stability, particularly in jobs requiring the use of large electrodes or multiple electrodes. The lack of stability arises from several sources, including the weight of the electrode structure itself, if the electrode is of irregular or eccentric configuration and hence causes eccentric loading of the orbiting tool support structure. A more important source of eccentric loading contributing to dynamic stability, however, arises from the reaction forces occurring in the course of the machining operations. These forces are substantial and they are inherently eccentric, due to the orbital movement of the electrode, which concentrates arcing at successive different horizontal locations in the course of the machining operation. The frequent result of this lack of dynamic stability is difficulty in controlling machining stability and maintaining close tolerances when an orbiting head is used as the electrode support system, particularly on jobs requiring the use of large electrodes or multiple electrodes. The same general considerations are applicable in other machine tools in which orbiting heads may be used, as in electro chemical machining (ECM) systems and in milling machines or other mechanical-cutting machine tools.

SUMMARY OF THE INVENTION

It is a principal object of the present invention, therefore, to provide a new and improved orbital tool support system for use in machine tools and particularly in EDM machines, which affords greatly improved dynamic stability, especially in those machining jobs that require the use of relatively large electrodes or multiple electrodes, other large tool elements, or high dielectric pressure systems.

A specific object of the invention is to provide a new and improved orbital tool support system, for an EDM machine or other machine tool, that is highly stable with respect to both static and dynamic forces, yet is readily adaptable to use on virtually any machine.

Another object of the invention is to provide a new and improved orbital tool support system for a machine tool, such as an EDM machine, in which the support of the machining electrode or electrodes or their equivalent is maintained independently of the actual orbiting mechanism.

A further object of the invention is to provide a new and improved orbital tool support system, particularly for an EDM or ECM machine, that permits precision machining with a single electrode or multiple electrodes, yet is relatively simple and inexpensive in construction and affords long, relatively maintenance-free life.

A prime feature of the present invention, in achieving all of these objectives, is the provision of an orbital tool support system in which the electrodes or other tools are entirely supported by an X-Y bridge, independently of any orbiting mechanism; an orbiting head is mounted within the support system, but is employed only for movement of a tool support plate that is part of the bridge. The orbital head does not support the tools.

Accordingly, the invention relates to an orbital tool support system for a machine tool, such as an EDM machine, of the kind comprising a base, a tool head mounted for vertical movement relative to a workpiece positioned on the base, and a tool head drive. The tool support system comprises an orbiting head including an upper head element, a lower head element, and orbital drive means, interconnecting the two head elements, for driving the two head elements horizontally in orbital motion relative to each other. A machine mounting plate is included, with machine mounting means for affixing the machine mounting plate in centered relation upon the tool head of the machine; a tool mounting plate is also included in the support system, with tool mounting means for rigidly mounting one or more electrodes in fixed position on the tool mounting plate. A plurality of bearing assemblies interconnect the two mounting plates at spaced peripheral locations, the bearing assemblies conjointly maintaining the two mounting plates parallel to each other and in fixed relative vertical positions but permitting limited horizontal movement therebetween; the orbiting head is mounted centrally between the two mounting plates with the upper head element affixed to the machine mounting plate to preclude horizontal movement relative thereto and the lower head element affixed to the top of the tool mounting plate, so that eccentric vertical forces to which the tool elements are subjected during operation of the machine tool are transmitted directly from the tool mounting plate to the machine mounting plate, through the bearing assemblies, bypassing the orbiting head.

BRIEF DESCRIPTION OF THE DRAWINGS

FIG. 1 is a front elevation view of an EDM machine equipped with an orbital tool support system constructed in accordance with the present invention;

FIG. 2 is a perspective view, partially cut away, of the orbital tool support system illustrated in FIG. 1;

FIGS. 3, 4 and 5 are plan, front, and side elevation views, respectively, of the tool support system of FIGS. 1 and 2;

FIG. 6 is a detail view, partly in cross section, of one of the bearing assemblies of the tool support system.

DESCRIPTION OF THE PREFERRED EMBODIMENT

Figure 4:
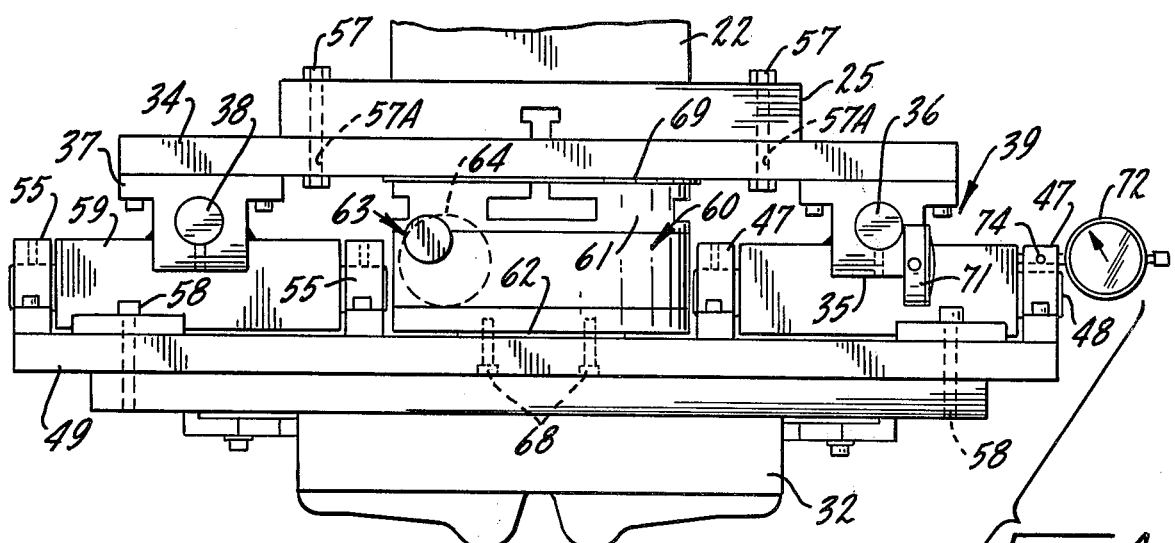

FIG. 1 illustrates a conventional EDM machine 10 comprising a base 11 upon which a bed 12 is mounted. A saddle 13 is supported upon bed 12 by a mounting arrangement that includes two lead screws 14 and 15 for precision positioning of the saddle 13. A work table 16 is in turn mounted upon saddle 13; table 16 supports a work tank 17 containing a dielectric bath 18. A workpiece 19 is mounted on table 16, within tank 17; the front of the tank is cut away in FIG. 1 to reveal its interior.

A pedestal 21 mounted on base 11 projects over tank 17 and affords a support for the vertically movable tool head 22. The operational movement for tool head 22 is generally indicated by the arrows A. A tool head drive motor 23 having a drive connection (not shown) to tool head 22 is mounted on pedestal 21 and is electrically connected to an EDM power supply and control unit 24. The power supply and control unit 24 may be entirely conventional in construction.

A tool support system 30, constructed in accordance with a preferred embodiment of the present invention, is shown mounted in EDM machine 10 in FIG. 1. The tool support system 30 is affixed to and supported by a platen 25 that constitutes the lowermost element of the tool head 22. Support system 30 includes an orbiting head 60 and has its own power supply and control unit 33. The construction and operation of tool support system 30 are described in detail hereinafter. A relatively large electrode 32, which may be of complex configuration, is mounted on the bottom of and projects downwardly from tool support system 30.

As thus far described, except for tool support system 30, the construction and operation of the overall system comprising EDM machine 10 is essentially conventional, so that only a brief description of its operation is necessary here. With workpiece 19 accurately positioned in the desired orientation relative to electrode 32, the controls of unit 24 are actuated to initiate downward movement of tool head 22, at the same time applying a succession of electrical current pulses to electrode 32 to develop a corresponding series of arc discharges between the electrode and workpiece 19. This succession of electrical discharges between the electrode and the workpiece results in machining of the workpiece, by erosion, in conformity to the configuration of the electrode. The downward movement of tool head 22 is maintained at a rate coordinated with the rate of removal of material from workpiece 19, this control being maintained through the use of suitable sensors and control circuits (not shown) of known construction. Thus, although the general movement of tool head 22 is downward, as electrode 32 penetrates the workpiece 19, the control 24 may frequently actuate the tool head drive to elevate the tool head a short distance, whenever conditions at the workpiece-electrode interface are such that short circuits may appear between the electrode and workpiece.

In an initial roughing operation, the orbiting tool support system 30 may be maintained inactive, with no horizontal movement of electrode 32. This mode of operation may, indeed, be maintained until electrode 32 has made its cut almost to the full depth of workpiece 19. In some machining operations, on the other hand, it may be desirable to effect orbital motion of electrode 32, in a horizontal plane at the beginning or at some intermediate step in the machining process. Generally speaking, orbital movement of electrode 32 is most frequently utilized in a secondary machining operation to provide final shaping and to afford a finished surface on the machined portions of the workpiece. For these finishing operations, the basic procedure is the same except that the electrode is subject to orbital motion, the energy level for the arc discharges is decreased, and the arc discharge frequency is increased.

Figure 5:
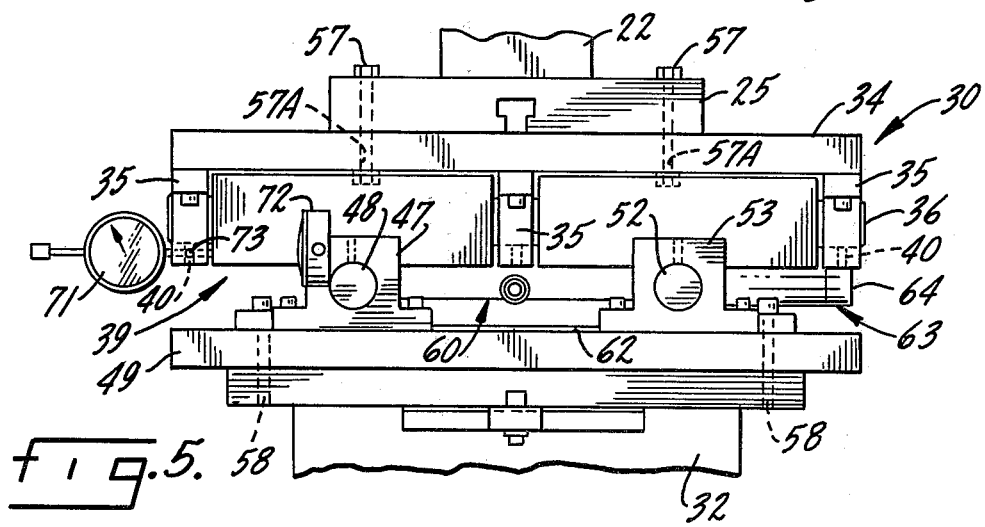

The general construction of tool support system 30, constituting a preferred embodiment of the present invention, is best shown in FIGS. 2 through 5. Tool support system 30 comprises a large, rigid machine mounting plate 34. Three shaft housings 35 are mounted on the bottom surface of the machine mounting plate 34 along the right-hand edge of the plate as seen in FIG. 2; see also FIGS. 4 and 5. A shaft 36 extends between and is supported by shaft housings 35, being held in fixed position therein by suitable means such as the set screws 40 (FIGS. 4 and 5). At the opposite end of machine mounting plate 34, as shown in FIGS. 2 and 4, a series of three shaft housings 37 are similarly employed to mount a second shaft 38 on the bottom of the plate, the two shafts 36 and 38 being mounted in parallel relationship in the direction indicated in FIGS. 2 and 3 by the arrows X.

A first dual-shaft bearing unit 39 is mounted on shaft 36 between two of the shaft supports 35, as shown in FIG. 2. The construction of shaft bearing unit 39 is best shown in FIG. 6. As shown therein, bearing unit 39 comprises two bushing housing elements 41 and 42 welded or otherwise securely affixed to each other in a 90° orientation; housing elements 41 and 42 could be machined from a single piece. Housing element 41 has a central bore 43 with two bushing and seal assemblies 44 mounted in its opposite ends. Simple sleeve bushings are shown in FIG. 6; preferably, however, ball bushing units are employed. Shaft 36 extends through the two bushing and seal assemblies 44; a tight sliding fit should be maintained, preferably with a total diametrical clearance of no more than 0.0015 inch. The other bushing housing element 41 has a corresponding central bore 45 in which two bushing and seal assemblies 46 are mounted to receive another shaft 48. Shaft 48 is mounted in two supports 47 secured to a large, rigid, tool mounting plate 49 as shown in FIGS. 2-5.

Shafts 36 and 48, together with bearing unit 39, comprise a first bearing assembly that interconnects the machine mounting plate 34 and the tool mounting plate 49 in the lower right-hand corner of support system 30, as viewed in FIG. 2, maintaining the two plates 34 and 49 parallel and in fixed vertical positions relative to each other but permitting limited horizontal movement therebetween in both the X direction along shaft 36 and in the Y direction along shaft 48. Similar bearing assemblies are provided at each of the other three corners of support system 30. Thus, in the upper right-hand corner of the support system, as seen in FIG. 2, a shaft bearing unit 51 engages both shaft 36 and a second Y-direction shaft 52, shaft 52 being mounted upon the top of the tool mounting plate 49 by a pair of supports 53. In the lower left-hand corner of the assembly, in FIG. 2, the bearing assembly comprises the X-direction shaft 38, a Y-direction shaft 54 mounted upon plate 49 by suitable supports 55, and an orthogonal shaft bearing unit 59 that engages both of the shafts in close-fitting sliding relation. A corresponding bearing assembly (not shown) is located in the upper left-hand corner of the tool support system 30 as shown in FIG. 2.

These four bearing assemblies conjointly maintain the two parallel plates 34 and 49 in firmly fixed vertical positions with respect to each other but permit limited controlled horizontal movement in both the X and Y directions. In fact, the construction of bridge 30 permits omnidirectional movement of plates 34 and 49, relative to each other, in a horizontal plane. In a typical tool support assembly, the total relative motion between the two plates 34 and 49 in either the X direction or the Y direction is usually limited to about one-eighth inch.

Of course, means must be provided for securing machine mounting plate 34 to the platen 25 of the tool head 22. This mounting means may be quite simple, such as four bolts 57 extending through holes 57A in plate 34 (FIGS. 2-5). Moreover, further mounting means are needed to mount electrode 32 on plate 49; similar means (e.g., bolts 58, FIGS. 3-5) may be employed. The basic requirement for both the machine mounting means and the tool mounting means is that a rigid mounting connection be provided; the particular mounting devices employed are not critical.

The orbital tool support assembly 30 further comprises the orbiting head and drive unit 60 mounted centrally between the machine mounting plate 34 and the tool attachment plate 49. Orbiting head 60 includes an upper head element 61, a lower head element 62, and an orbital drive 63 interconnecting the two head elements. The orbital drive 63 is powered by an electric motor 64, preferably a gear motor affording a direct low speed drive to the orbit mechanism. A hydraulic or pneumatic drive may be used.

Figure 7:
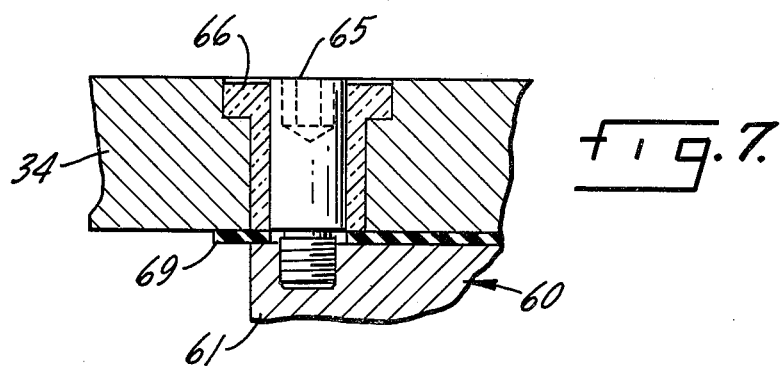
FIG. 7 is a detail sectional view of an insulator mounting used for a part of the tool support system, taken approximately along line 7—7 in FIG. 3.

The lower head element 62 of unit 60 is fixedly mounted upon the upper surface of the orbiting tool attachment plate 49 at the center of support system 30 by suitable means such as the bolts 68; see FIG. 4. A sheet of electrical insulation 69 is preferably affixed to the top surface of the upper head element 61. The upper head element 61 of the orbiter unit 60 is firmly secured to the machine mounting plate 34, for horizontal movement, by a pair of pins 65 which extend through electrical insulator bushings 66 and are threaded into head element 61 as shown in the detail view of FIG. 7.

As shown in FIGS. 2, 4 and 5, two of the shaft housings 35 and 47 are drilled to receive indicators 71 and 72, respectively, the indicators being held in place by set screws 73 and 74. Indicators 71 and 72 afford a direct reading of the extent of horizontal orbital motion in the X and Y directions respectively. Orbit head 60 may include a dial indicator 75.

The internal construction of orbiting head 60 is not shown in the drawings because this may be a conventional orbital drive unit of the kind that has been used as a direct support for the electrode of an EDM machine and can be adapted to other machine tool applications. In the illustrated construction, orbiter 60 constitutes an orbit head and power unit manufactured in France by Sondure Electrique Languepin and distributed in the United States, through UTI Corporation, under the designation TAEN-2. That orbiting head is, essentially, an improved embodiment of the orbiting apparatus of Braudeau et al U.S. Pat. No. 3,433,919. However, the tool support system 30 is not dependent upon use of this particular orbital drive and others may be substituted for the Languepin apparatus if desired. Control 33 for orbiting head 60 preferably provides for controlled variation of both the speed and distance of orbital movement (e.g., 2-15 rmp and 0-0.100 inch). Again, the control unit is commercially available, from the same source as the head itself, and hence is not described in detail; other (e.g., servo-controlled) units can be employed.

In the construction of tool support system 30 for use in an EDM machine, it is desirable to use materials which are resistant to corrosion in addition to affording high strength and rigidity, since the EDM process may result in the release of some relatively corrosive vapors from the dielectric bath 18 (FIG. 1). ECM processing presents even worse corrosion conditions. Stainless steel can be employed for the principal components, including plates 34 and 49 and the various shaft supports and other principal components of the bearing assemblies that join the two plates, and is recommended for ECM applications. On the other hand, the weight of a stainless steel tool support structure of this size, which may have plate dimensions ranging up to sixty inches, may be excessive in some instances. Consequently, a preferred material for most of the major structural components of tool support system 30 when employed in an EDM machine, including the plates, the shaft bearing housings, and the shaft supports, is high strength aluminum, such as 6061 aluminum tooling plate material.

In operation, the weight of the electrodes and all eccentric vertical loading applied to the electrodes in the course of the EDM machining operation is transmitted directly through tool support system 30 to the tool head 22 of machine 10 without materially stressing the orbit head and power unit 60. The orbit head, actuated by its own control 33, applies the desired orbital motion to tool mounting plate 49 by reaction against machine mounting plate 34, providing for effective precision-controlled orbital EDM machining. The substantial vertical loads to which electrode 32 is subjected, particularly in machining a large workpiece, are effectively bypassed with respect to orbiting head 60, affording a tool support of markedly improved dynamic stability as compared with any arrangement in which the electrodes (or other tools) are mounted directly on the orbiter.

Tool support system 30 could be made integral with an individual EDM machine or other machine tool. On the other hand, it is more practically and preferably provided as a separate unit that can be readily fit onto virtually any machine. This permits ready retrofit of existing EDM machines, and also allows use of one tool support system with several different EDM machines. Tool support system 30 materially increases the effective capacity, with respect to both weight and size, of any orbiting head. For example, using the TAEN-2 orbiter, the bridge structure of tool support system 30 easily increases the weight capacity from thirty-three pounds to two thousand pounds or even more. Substantial horizontal loading (e.g., about 225 pounds for the TAEN-2 orbiter) can be accommodated without inducing instability. Moreover, with the tool support system 30, machining jobs requiring the use of a large electrode or of a large number of electrodes can be carried out with an accuracy ($\pm 0.0005$ inch) that is not ordinarily attainable for comparable jobs when the electrodes are mounted directly on the orbiter. As compared with conventional EDM techniques, tool support system 30 provides substantial savings in preparation of electrodes and in the finishing (benching) of dies and other workpieces.

In tool support system 30, there are four bearing assemblies at the four corners of the plates 34 and 49, with the X-direction shafts 36 and 38 each being common to two bearing assemblies. This preferred construction is subject to modification; for example, two separate shafts can be employed for each of the X-direction shafts, in the same manner as shown for the Y-direction shafts (e.g., shafts 48 and 52). Other modifications of the X-Y bridge construction will be readily apparent, as will its application to ECM machines and other machine tools.

We claim:

1. An orbital tool support system for a machine tool, such as an EDM machine, of the kind comprising a base, a tool head mounted for vertical movement relative to a workpiece positioned on the base, and a tool head drive, the tool support system comprising:

an orbiting head including an upper head element, a lower head element, and orbital drive means, interconnecting the two head elements, for driving the two head elements horizontally in orbital motion relative to each other;

a machine mounting plate;

first mounting means for affixing the machine mounting plate in centered relation upon the tool head of the machine;

a tool mounting plate;

tool mounting means for rigidly mounting one or more tool elements in fixed position on the tool mounting plate;

a plurality of bearing assemblies, interconnecting the two mounting plates at spaced peripheral locations, the bearing assemblies conjointly maintaining the two mounting plates parallel to each other and in fixed relative vertical positions but permitting limited horizontal movement therebetween;

and the orbiting head being mounted centrally between the two mounting plates with the upper head element affixed to the machine mounting plate to preclude horizontal movement relative thereto and the lower head element affixed to the top of the tool mounting plate, so that eccentric vertical forces to which the tool elements are subjected during operation of the machine tool are transmitted directly from the tool mounting plate to the machine mounting plate, through the bearing assemblies, bypassing the orbiting head.

2. An orbital tool support system according to claim 1, for use in an EDM machine in which the machine mounting plate and the tool mounting plate are both formed of high strength, high rigidity aluminum.

3. An orbital tool support system according to claim 1, for use in an EDM or ECM machine, in which the mounting plates and bearing assemblies are formed of stainless steel.

4. An orbital tool support system for a machine tool, according to claim 1, in which each bearing assembly comprises:

an X-direction shaft mounted on the bottom of the machine mounting plate;

a Y-direction shaft mounted on the top of the tool mounting plate, oriented at an angle of 90° to the X-direction shaft;

and a bearing housing, having two shaft-receiving apertures therein oriented at an angle of 90° to each other, engaging both shafts in close fitting sliding relation.

5. An orbital tool support system for a machine tool, according to claim 4, including four bearing assemblies, located at and interconnecting the four corners of the mounting plates.

6. An orbital tool support system for a machine tool, according to claim 5, in which there are only two shafts in at least one of the X and Y directions, each shaft in that direction joining two bearing assemblies.

* * * * *